(12) United States Patent
Fukasawa et al.

(10) Patent No.: US 8,733,991 B2
(45) Date of Patent: May 27, 2014

(54) VEHICLE LAMP

(75) Inventors: Yosuke Fukasawa, Kiryu (JP); Hitoshi Kurihara, Kiryu (JP); Akifumi Suzuki, Toyota (JP); Atsushi Obata, Toyota (JP)

(73) Assignee: Mitsuba Corporation (JP)

( * ) Notice: Subject to any disclaimer, the term of this patent is extended or adjusted under 35 U.S.C. 154(b) by 252 days.

(21) Appl. No.: 13/126,069

(22) PCT Filed: Oct. 19, 2009

(86) PCT No.: PCT/JP2009/005433
§ 371 (c)(1),
(2), (4) Date: Jun. 20, 2011

(87) PCT Pub. No.: WO2010/050137
PCT Pub. Date: May 6, 2010

(65) Prior Publication Data
US 2011/0235353 A1    Sep. 29, 2011

(30) Foreign Application Priority Data

Oct. 31, 2008 (JP) ................................. 2008-281142

(51) Int. Cl.
*B60Q 1/26* (2006.01)
*F21V 9/00* (2006.01)
*F21V 7/04* (2006.01)
*F21V 11/00* (2006.01)
*G02B 5/02* (2006.01)
*F21V 33/00* (2006.01)
*F21V 29/00* (2006.01)

(52) U.S. Cl.
USPC ........... 362/494; 362/511; 362/558; 362/562; 362/267

(58) Field of Classification Search
USPC .......................... 362/558, 494, 562, 267, 511
See application file for complete search history.

(56) References Cited

U.S. PATENT DOCUMENTS

| | | | | |
|---|---|---|---|---|
| 6,139,171 A * | 10/2000 | Waldmann | ..................... | 362/494 |
| 6,299,334 B1 * | 10/2001 | Schwanz et al. | ............... | 362/511 |
| 6,315,437 B1 * | 11/2001 | Katz et al. | ...................... | 362/494 |
| 6,637,917 B2 * | 10/2003 | Schwanz et al. | ............... | 362/487 |
| 6,880,960 B2 * | 4/2005 | Mishimagi | ..................... | 362/522 |
| 7,134,772 B2 * | 11/2006 | Furuya et al. | .................. | 362/494 |

(Continued)

FOREIGN PATENT DOCUMENTS

| | | |
|---|---|---|
| JP | 2002-362222 | 12/2002 |
| JP | 2005-132335 | 5/2005 |

(Continued)

*Primary Examiner* — Jong-Suk (James) Lee
*Assistant Examiner* — Bryon T Gyllstrom
(74) *Attorney, Agent, or Firm* — Gerald E. Hespos; Michael J. Porco; Matthew T. Hespos

(57) ABSTRACT

A vehicle lamp is formed using a light guide body. Thus light with an excellent aesthetic quality can be emitted without increasing the number of components. The structure has a light guide part (6a) formed on a light guide member (6). The light guide part (6a) emits light in an elongated shape by irradiating a first light-emitting diode (9) provided on one end of the light guide part (6a) in the longitudinal direction. A projecting part (6g) projects reward on the rear face of the light guide part (6a), which is the light-emitting face. A light emission suppressing part (6h) is provided on the projection end face of the projecting part (6g) and has a metal film (6f) formed by vapor deposition.

3 Claims, 9 Drawing Sheets

(56) References Cited

U.S. PATENT DOCUMENTS

| | | | |
|---|---|---|---|
| 7,220,030 B2 * | 5/2007 | Yagi | 362/494 |
| 7,347,598 B2 * | 3/2008 | Seguchi | 362/494 |
| 7,357,542 B2 * | 4/2008 | Waldmann | 362/494 |
| 7,357,549 B2 * | 4/2008 | Gunther | 362/551 |
| 2006/0210236 A1 * | 9/2006 | Waldmann | 385/147 |
| 2007/0058383 A1 * | 3/2007 | Gunther | 362/494 |

FOREIGN PATENT DOCUMENTS

| | | |
|---|---|---|
| JP | 2005-138817 | 6/2005 |
| JP | 2006-256606 | 9/2006 |
| JP | 2007-250290 | 9/2007 |
| JP | 2008-221965 | 9/2008 |
| JP | 2008-226755 | 9/2008 |

* cited by examiner

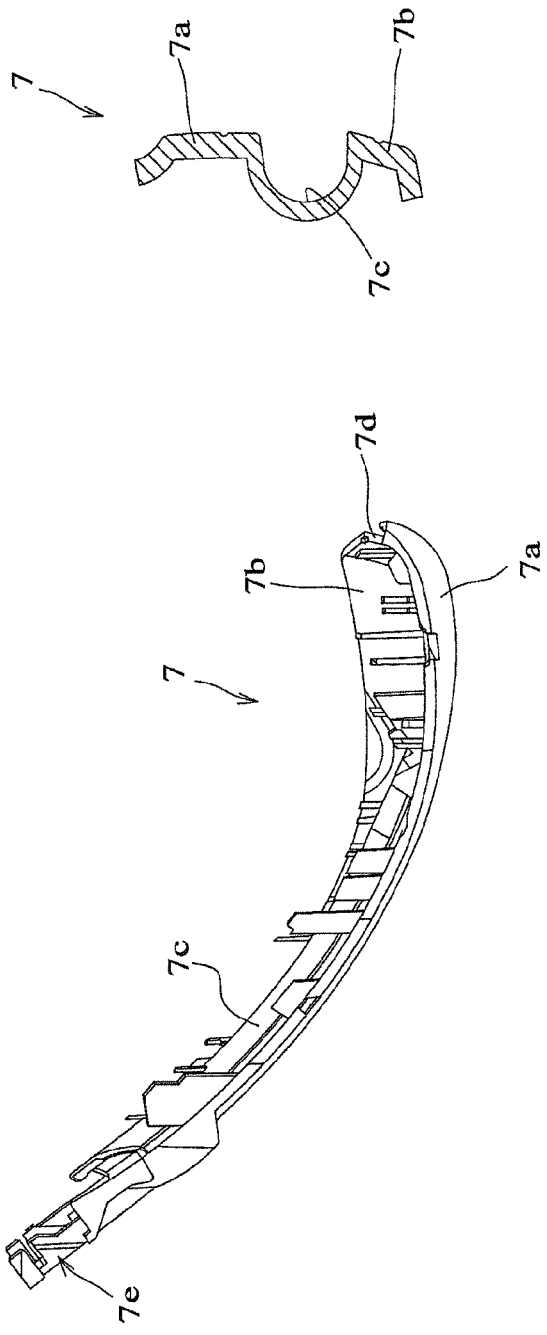
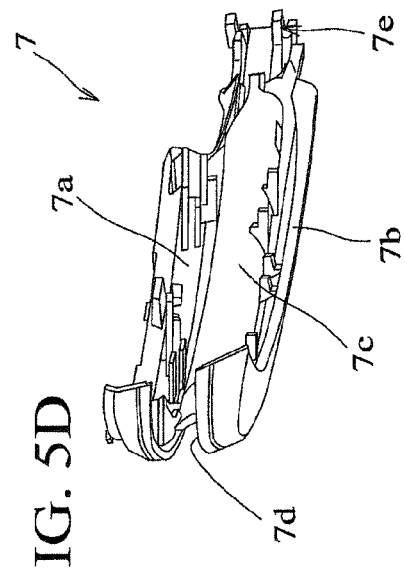
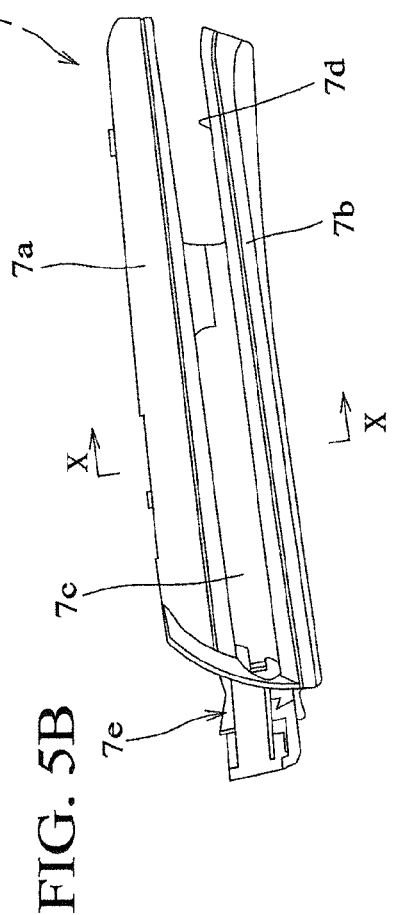
FIG. 5A
FIG. 5C
FIG. 5B
FIG. 5D

VEHICLE LAMP

BACKGROUND OF THE INVENTION

1. Field of the Invention

The present invention relates to a vehicle lamp mounted to a vehicle such as an automobile.

2. Description of the Related Art

Japanese Published Unexamined Patent Appl. No. 2007-250290 discloses a vehicle lamp formed by using a long solid light guide. A long light is radiated from the light guide when the light guide is irradiated by a light source disposed to an end portion in a longer-length direction of the light guide. The vehicle lamp can be used as a direction indicator lamp mounted into a door mirror. Indeed, the direction indicator lamp has been frequently used because legal requirements are satisfied by the emitted long light and the direction indicator lamp is excellent in design properties.

In order to improve design properties of the direction indicator lamp with the light guide, a plurality of light sources are disposed to an end portion of the light guide so that the direction indicator lamp (the light guide) emits a plurality of long lights.

However, the conventional direction indicator lamp needs more components and configurations are complicated because the plurality of light sources are mounted. A large number of components need to be installed into a small space, with a resultant exacting installation and increased cost. The present invention intends to solve the problems.

SUMMARY OF THE INVENTION

In view of the circumstances discussed above, the present invention has been made in order to solve the problems, and a first exemplary aspect of the present invention provides a vehicle lamp using a long solid light guide, wherein the light guide forms a long light radiation by irradiation from a light source provided at an end portion in a longer-length direction of the light guide, and a light radiation suppressing portion is provided on a light radiating surface of the light guide.

According to the first exemplary aspect, the vehicle lamp is excellent in visibility and design properties because of the light radiation appearing as if a plurality of lights are divided when the light guide is irradiated by one light source.

A second exemplary aspect of the present invention provides the vehicle lamp according to the first exemplary aspect, wherein the light radiation suppressing portion is a vapor-deposited portion formed on the light radiating surface of the light guide.

According to the second exemplary aspect, the light radiation suppressing portion is excellent in durability.

A third exemplary aspect of the present invention provides the vehicle lamp according to the first or second exemplary aspect, wherein the light radiation suppressing portion is provided on a projection formed on the light guide.

A fourth exemplary aspect of the present invention provides the vehicle lamp according to the first or second exemplary aspect, wherein the light radiation suppressing portion is provided on a recess formed on the light guide.

A fifth exemplary aspect of the present invention provides the vehicle lamp according to the first exemplary aspect, wherein the light radiation suppressing portion is a vapor-deposited portion formed in an interior of the light guide.

A sixth exemplary aspect of the present invention provides the vehicle lamp according to the first exemplary aspect, wherein an outer lens is provided in the light radiating direction of the light guide, and the light radiation suppressing portion is provided on the outer lens.

According to the third to sixth exemplary aspects, the light radiation suppressing portion is easy to form and a light shading is clear at a lower illuminant portion where the light radiation is reduced in suppression.

A seventh exemplary aspect of the present invention provides the vehicle lamp according to any one of the first to sixth exemplary aspects, wherein the light radiation suppressing portion is positioned at an intermediate portion in a shorter-length direction of the light guide and formed in the longer-length direction.

According to the seventh exemplary aspect, a design property is achieved as if the light is emitted from two light guides in appearance when one light guide is irradiated by one light source.

A eighth exemplary aspect of the present invention provides the vehicle lamp according to any one of the first to seventh exemplary aspects, wherein the light radiation suppressing portion is formed of a metal film.

According to the eighth exemplary aspect, the light radiation suppressing portion is further improved in durability.

A ninth exemplary aspect of the present invention provides the vehicle lamp according to any of the first to eighth exemplary aspects, which is a direction indicator lamp installed into a door mirror.

According to the ninth exemplary aspect, the direction indicator lamp is excellent in visibility and design properties.

A tenth exemplary aspect of the present invention provides the vehicle lamp according to the ninth exemplary aspect, wherein the light radiation suppressing portion is formed by a body of the door mirror.

According to the tenth exemplary aspect, the door mirror body doubles as the light radiation suppressing portion, achieving a simplified structure.

BRIEF DESCRIPTION OF THE DRAWINGS

FIG. 5A, FIG. 5B, FIG. 5C, and FIG. 5D are respectively a plan view, a back view, a sectional view along X-X of FIG. 5A, and a side view of an inner member.

DETAILED DESCRIPTION OF THE PREFERRED EMBODIMENTS

Embodiments of the present invention will be discussed with reference to the drawings.

Figure 1A:
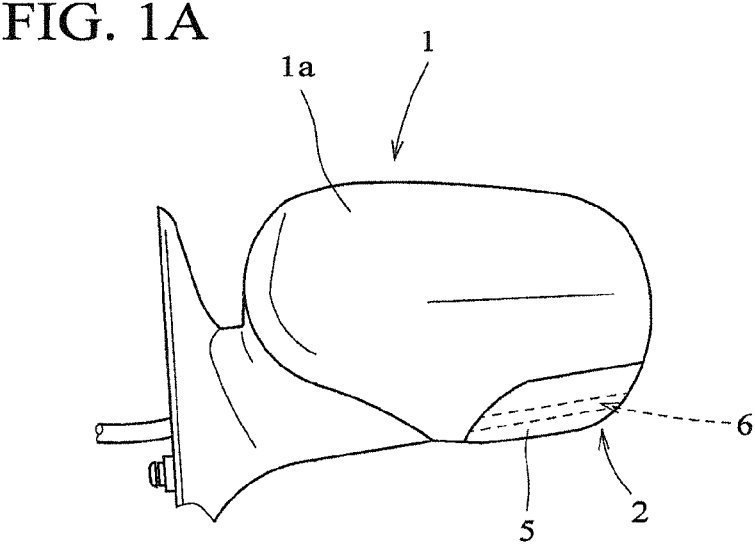
FIG. 1A is an entire perspective view of a door mirror and FIG. 1B is a back view of a turn lamp.
Figure 1A:
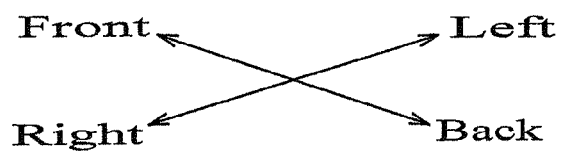
Figure 1B:
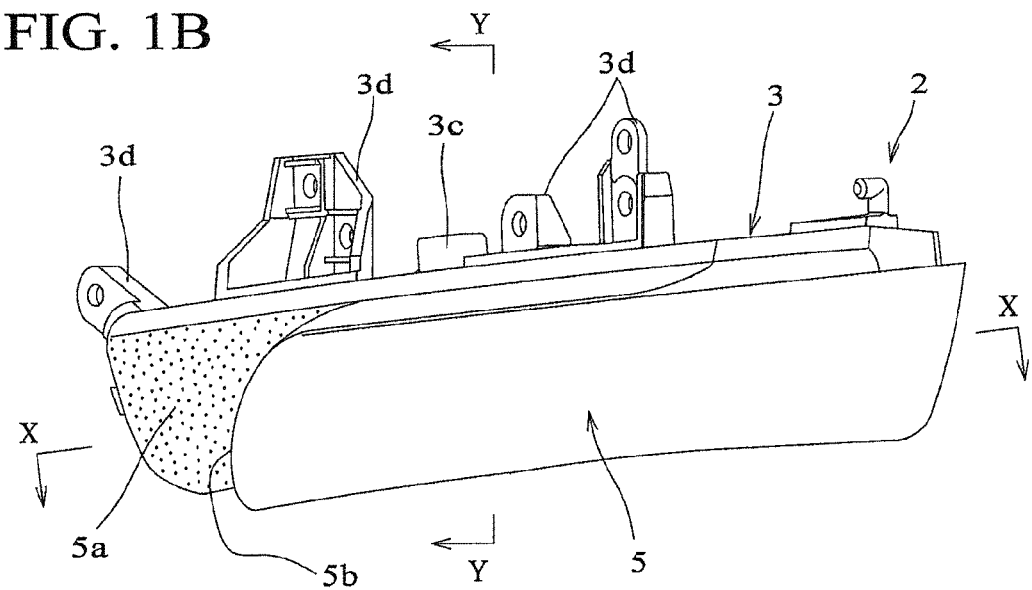
Figure 2A:
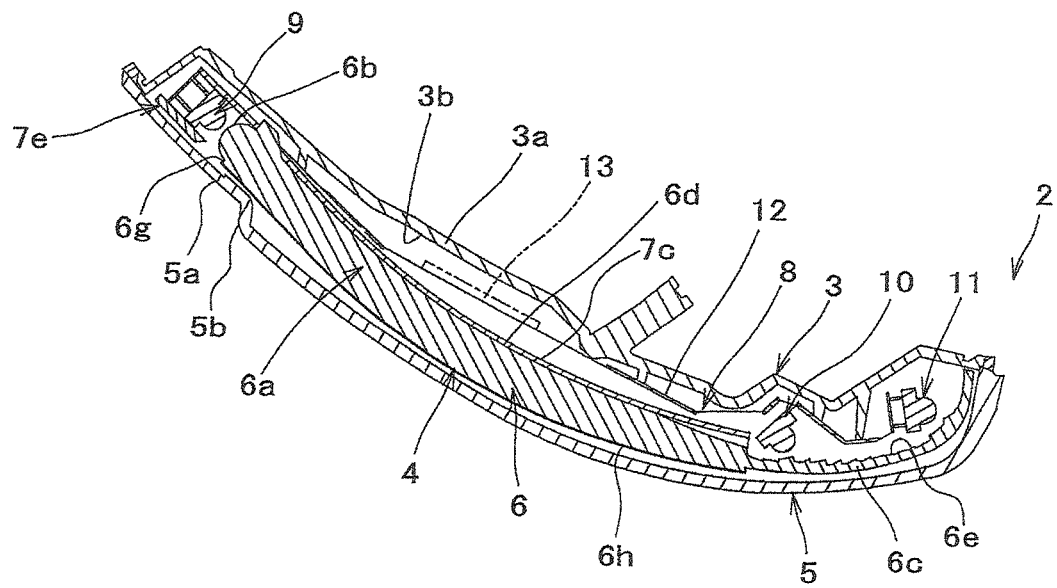
FIG. 2A and FIG. 2B are respectively a sectional view along X-X and a sectional view along Y-Y of FIG. 1B.
Figure 2B:
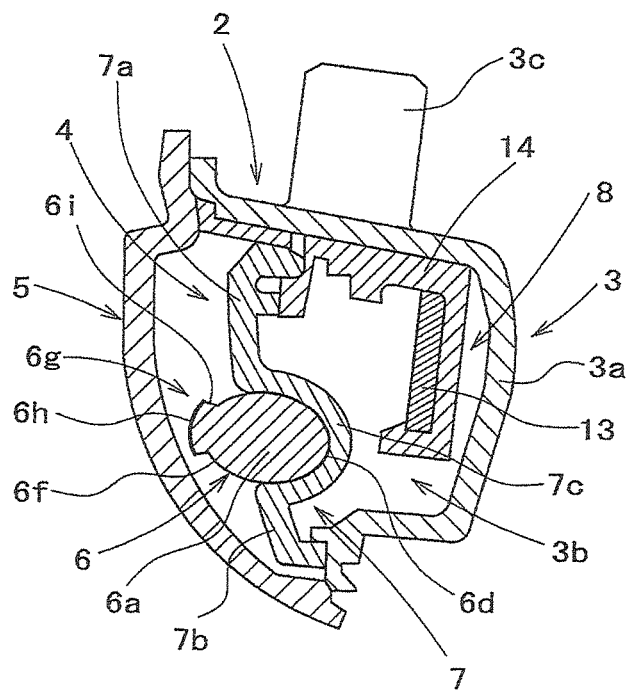

In FIG. 1, a door mirror 1 is attached to a door of a vehicle. A body 1a of the door mirror 1 includes an opening anteriorly; and a mirror (not illustrated) fit into the opening and positioned adjustably. A rear portion of the body 1a is formed to bulge rearward, defining a back surface side of the mirror. A turn lamp 2—the present invention is carried out—is integrated into a lower portion of a bulging portion of the body 1a in a unified manner. Turning on the turn lamp 2 radiates light from behind of the door mirror 1 (front of the vehicle) toward either a left end portion or a right end portion of the door mirror 1.

The door mirror 1 will be mounted bilaterally and symmetrically to both left and right door bodies of the vehicle. However, the door mirror 1, which is attached to the left side of the vehicle as illustrated in FIG. 1, will be discussed below. A description will be omitted with regard to a right side door mirror 1.

The turn lamp 2 is an assembly component to be installed into the door mirror 1 at the lower portion of the rearward bulging portion of the body 1a that forms the rear side (the back surface side) of the mirror.

The turn lamp 2 includes a base housing 3 and an inner housing 4; and an outer lens 5. The base housing 3 and the inner housing 4 are housed inside (mirror side) of the body 1a. The outer lens 5 covers a rear portion of the inner housing 4 and is exposed outside together with an outer peripheral surface of the body 1a.

Figure 3A:
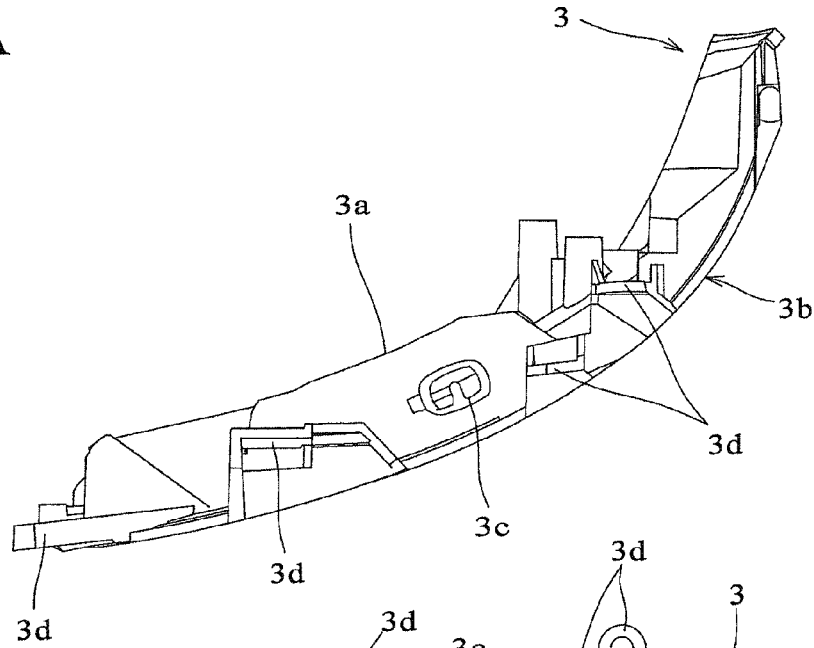
FIG. 3A, FIG. 3B, and FIG. 3C are respectively a plan view, a back view, and a side view of a base housing.
Figure 3B:
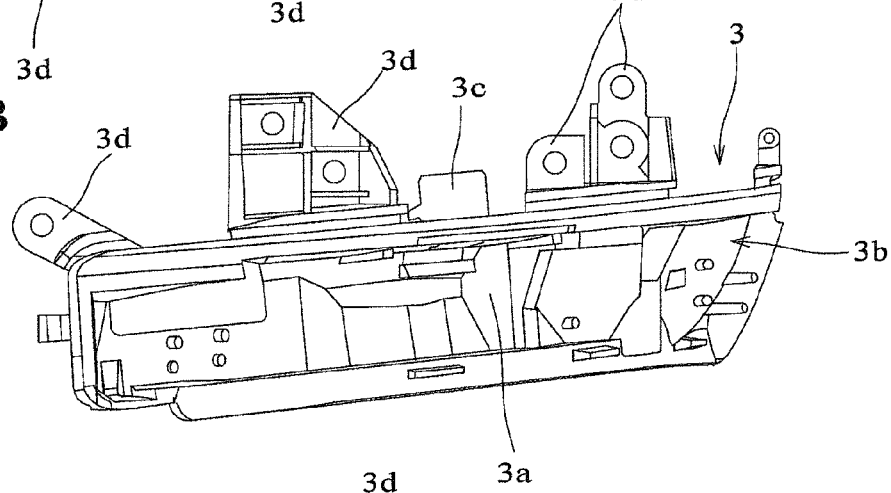
Figure 3C:
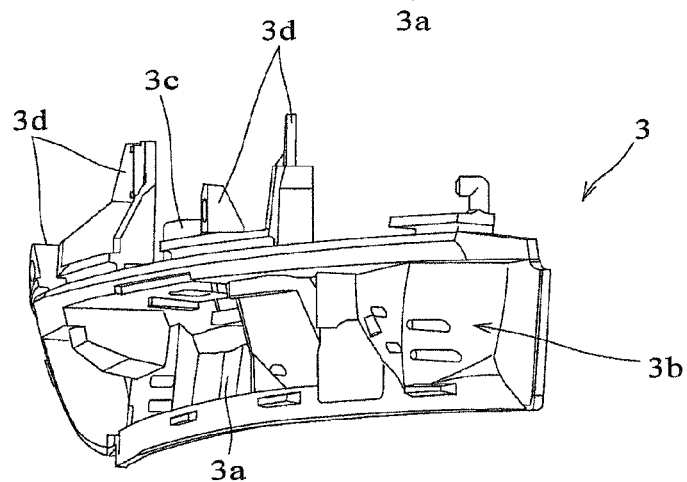
Figure 4A:
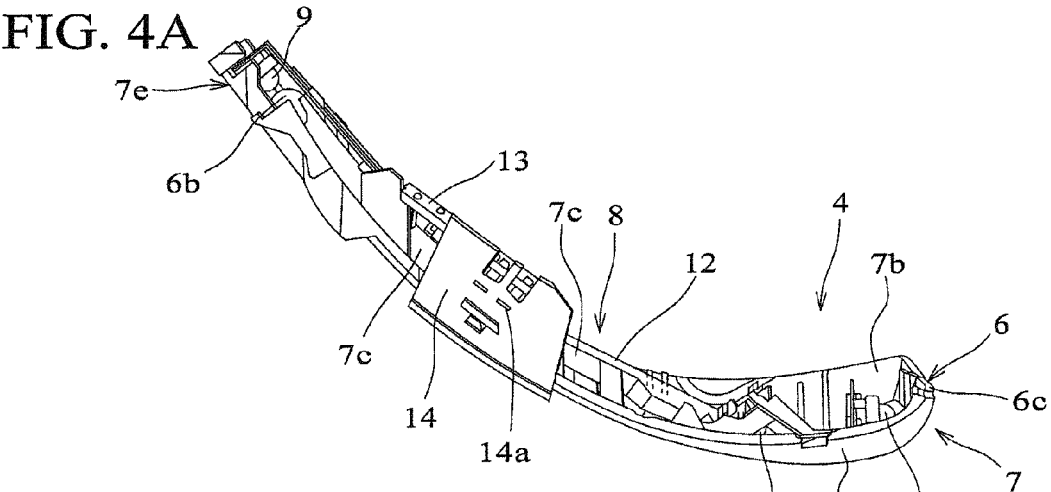
FIG. 4A, FIG. 4B, FIG. 4C, and FIG. 4D are respectively a plan view, a back view, a front view, and a side view of an inner assembly.
Figure 4B:
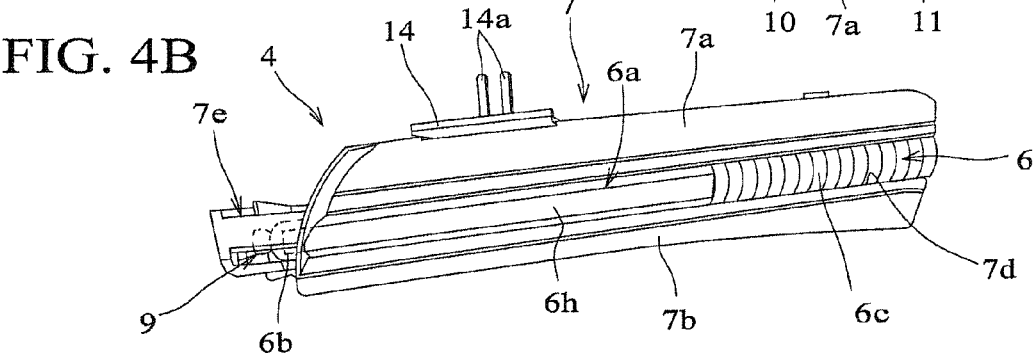
Figure 4C:
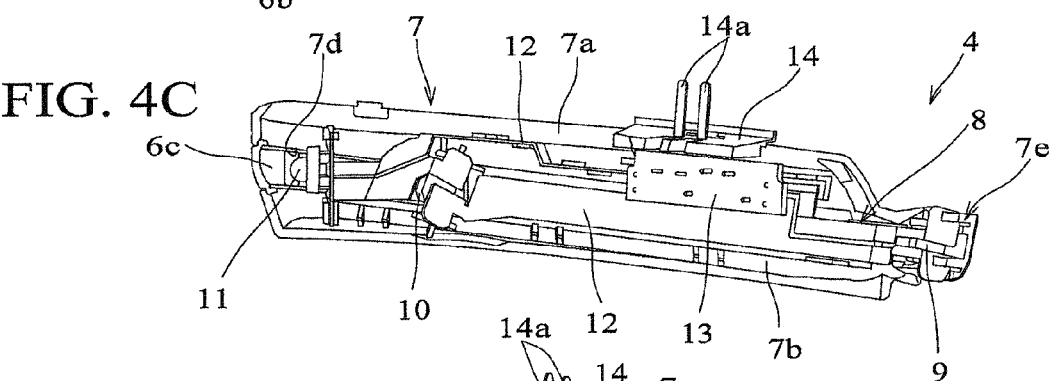
Figure 4D:
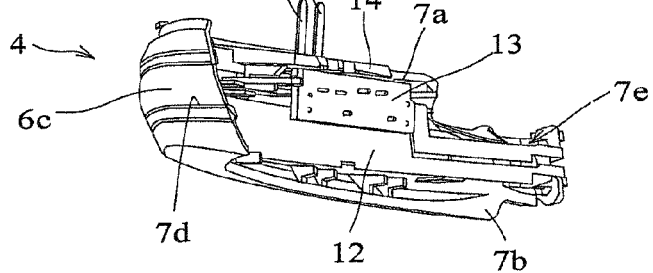
Figure 6A:
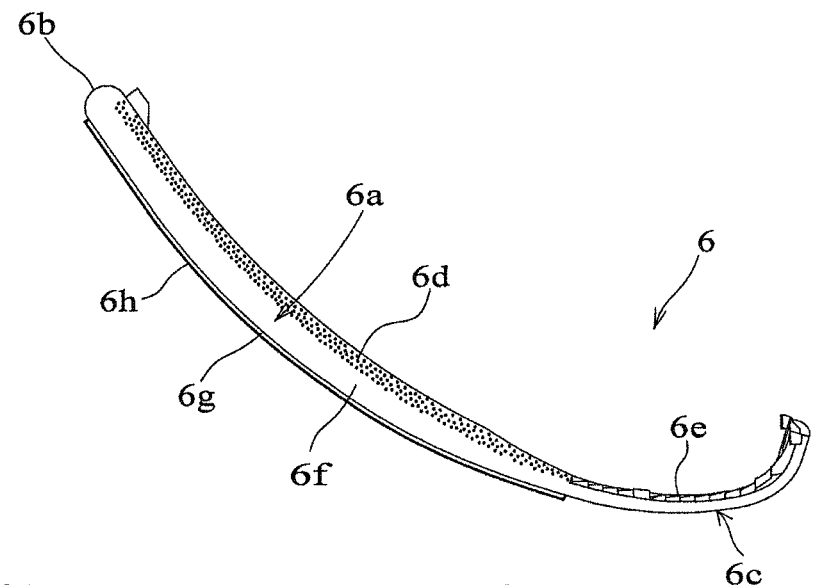
FIG. 6A, FIG. 6B, and FIG. 6C are respectively a plan view, a back view, and a sectional view along X-X of FIG. 6B of a light guide member.
Figure 6B:
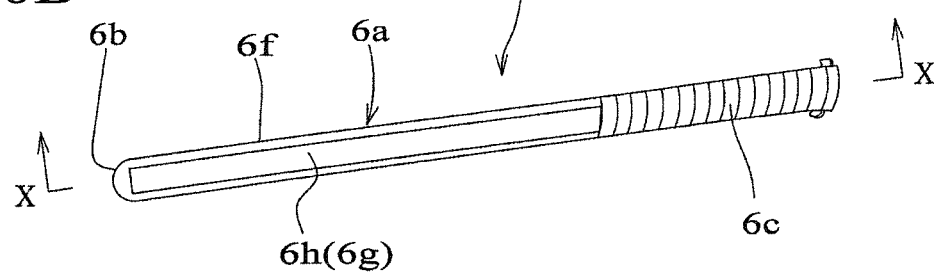
Figure 6C:
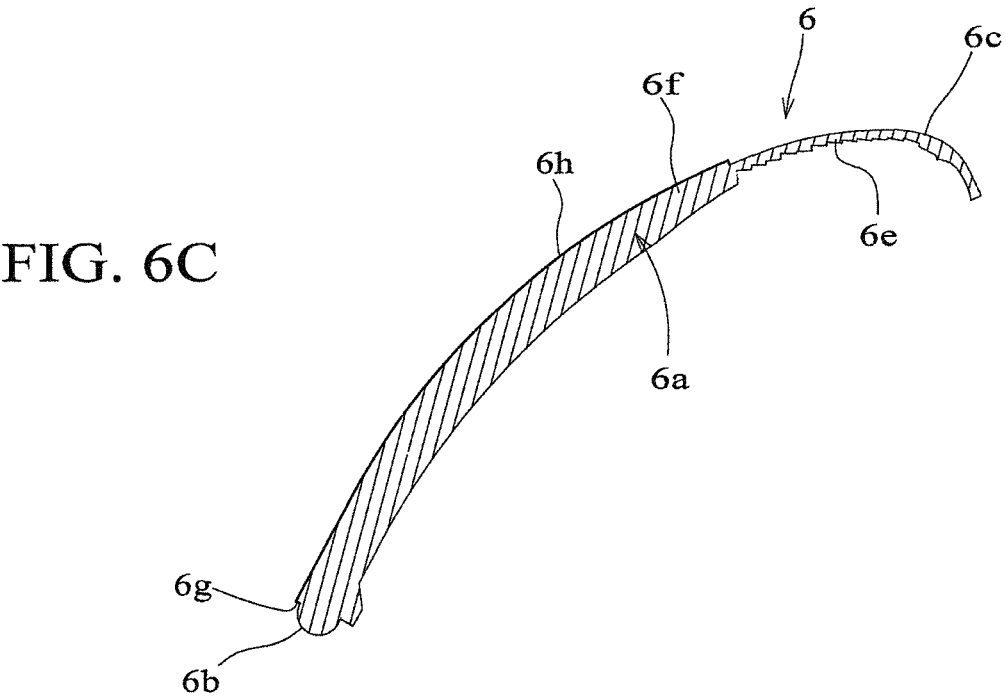
Figure 7:
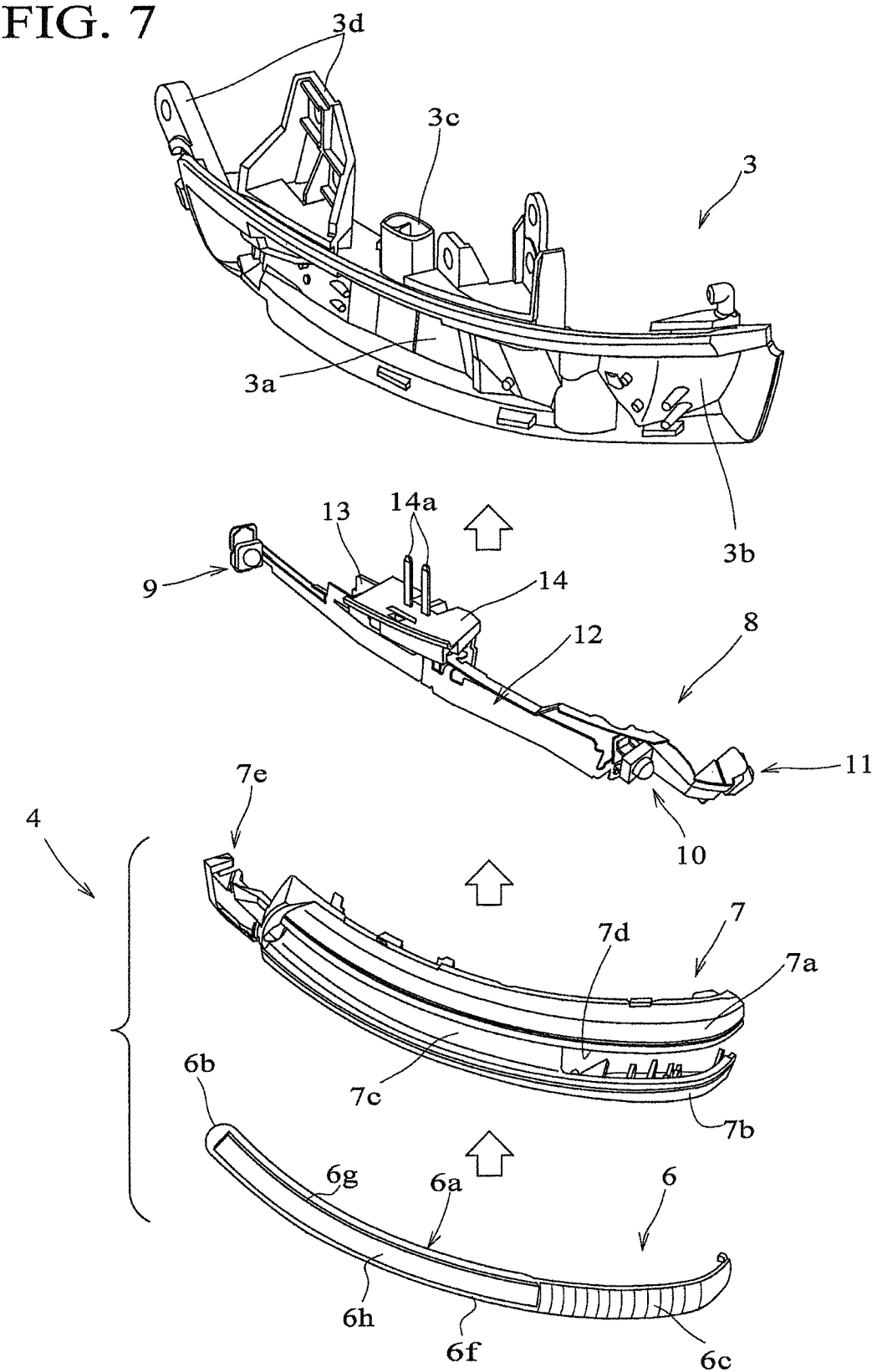
FIG. 7 is an exploded perspective view illustrating an installation state of the base housing and the inner assembly.

The base housing 3, which is integrally molded from a non-translucent resin material, is formed to be curved and long in a right and left direction as illustrated in FIGS. 3A-3C so that the base housing 3 is placed into the lower portion of the door mirror body 1a. The base housing 3 also has a left end portion curved forward to be arched and facing an outer side in a right and left direction of the vehicle body. The base housing 3 also includes a bottom piece 3a; and a recess 3b open leftward from a rear. The recess 3b is covered when the inner housing 4 is installed into the recess 3b from the rear thereof.

A connecting portion 3c is connected to an external power supply. An attaching piece 3d is for integration with the body 1a of the door mirror 1.

The inner housing 4, which is made of a translucent resin material, is formed to be long in the right and left direction and has a left end portion curved forward to be arched similar to the base housing 3, as illustrated in FIGS. 4A-4D. In the present embodiment, the inner housing 4 is formed by integrating a light guide member 6 and an inner member 7. The light guide member 6 includes a long and solid, sectionally circular (columnar) light guide portion 6a, which corresponds to a light guide of the present invention.

The inner member 7 includes a pair of upper and lower flange pieces 7a and 7b; and an integrating piece 7c connected between the flange pieces 7a and 7b, as illustrated in FIGS. 5A-5D. The integrating piece 7c is formed to have a concave groove shape biased forward more than the upper and lower flange pieces 7a and 7b. The integrating piece 7c also has a left end portion of the integrating piece 7c cut between the upper and lower flange pieces 7a and 7b, which is a hollow portion 7d. A support piece 7e is formed to extend from right ends of the upper and lower flange pieces 7a and 7b and be positioned at a right end of the integrating piece 7c. The support piece 7e fixes and supports a first light emitting diode 9 in a positioning manner. The first light emitting diode 9 is disposed to a light source unit 8, which will be discussed more later.

A light shielding means may be provided to the inner member 7. The light shielding means may be applied overall with graining or a reflective film, for example, or made of a non-transparent or preferably a non-translucent resin material. With the light shielding means provided, the light source unit 8, which is installed to a front side of the inner member 7, cannot be observed visually from the outer lens 5 side. Thus, design properties can be improved, and light leakage from the light source unit 8 can be prevented.

The light guide member 6 is formed to have a curved shape using a transparent member (i.e., translucent resin material; for example, acrylic resin, polycarbonate resin, and the like). The light guide portion 6a, which is formed to be columnar, faces rearward. A semispherical light entering portion 6b is formed at a right end portion of the light guide portion 6a. An inner lens portion 6c is formed toward a left end portion of the light guide portion 6a. The inner lens portion 6c is flat, curved forward to be arched, and faces leftward. The light guide member 6 is installed into the inner member 7 from the rear. The light guide portion 6a is fit and held in the concave groove shape of the integrating piece 7c. Through the hollow portion 7d, the inner lens portion 6c is exposed forward and directly opposed to the base housing 3.

The light guide portion 6a of the light guide member 6 is formed such that a light shielding means is provided to a front surface 6d corresponding to a curve inner side portion of the light guide portion 6a to prevent light leakage. The light shielding means is provided such that the front surface 6d is applied with graining to have a non-smooth surface to shielding light. Further, a diffuse reflection means is provided to the inner lens portion 6c of the light guide member 6 to diffusely reflect light entering a front surface 6e. The diffuse reflection means diffusely reflects the light by a plurality of concave and convex surfaces formed to the front surface 6e. The light guide portion 6a is thus configured such that the light leakage through the front surface 6d is prevented and a rear surface 6f corresponds to a light radiating surface. The inner lens portion 6c is thus configured such that the diffusely reflected light is radiated leftward from the rear.

A projection 6g is formed on the rear surface 6f, positioned at an intermediate portion in an upper and lower direction (intermediate portion in a shorter-length direction of the light guide portion 6a), and has a predetermined width in the upper and lower direction. The projection 6g projects rearward and extends overall in a right and left direction of the rear surface 6f corresponding the light radiating surface of the light guide portion 6a. A light radiation suppressing portion 6h is provided to a projecting end surface (rear end surface) of the projection 6g. The light radiation suppressing portion 6h of the present embodiment is a vapor-deposited portion by vapor deposition. By evaporating a metal (aluminum, for example), a film of the metal is deposited over the projecting end surface of the projection 6g to form the light radiation suppressing portion 6h.

The light radiation suppressing portion 6h, which is the vapor-deposited portion, is excellent in durability. When the light radiation suppressing portion 6h is formed by vapor deposition, a portion other than the vapor-deposited portion of the light guide portion 6a needs to be masked such that only the portion to be vapor-deposited is vapor-deposited. In the present embodiment, the light guide portion 6a includes the projection 6g, the projecting end surface of which is vapor-deposited, thereby accomplishing a resulting easy and reliable masking without misalignment. In short, the light radiation suppressing portion 6h is easy to form and excellent in durability.

A radiation of light entering from the light entering portion 6b is suppressed in the light radiation suppressing portion 6h provided on the rear surface. A lower illuminant portion is thus formed in the intermediate portion in the upper and lower direction when the light is radiated from the rear surface 6f of the light guide portion 6a. This achieves a design property as if two lights are radiated long in the right and left direction in appearance. Further, the light is radiated from a stepped surface 6i of the projection 6g because the light radiation suppressing portion 6h is only on the projecting end surface of the projection 6g. Thus, a shading of the light adjacent to the light radiation suppressing portion 6h is intensified, which achieves a design property as if the light is emitted from two light guides in appearance.

The light source unit 8 is incorporated between the base housing 3 and the inner housing 4. In the present embodiment, the first emitting diode 9, a second emitting diode 10, and a third light emitting diode 11 are properly connected and integrated to a bus bar 12 for light sources of the turn lamp 2. The bus bar 12 of the light source unit 8 is formed to be curved. A substrate 13 is provided to a curved inner surface of the bus bar 12, the curved inner surface corresponding to an anterior surface of the bus bar 12. Properly wired and mounted to the substrate 13 are the first to third light emitting diodes 9 to 11 and other necessary electronic components. The light source unit 8 is held by the inner housing 4 (inner member 7). The inner housing 4 and the light source unit 8 are incorporated as a unit forming an inner assembly. The inner assembly is incorporated between the base housing 3 and the outer lens portion 5. The light source unit 8 includes an intermediate member 14 integrated with the substrate 13. A front end edge portion of the intermediate member 14 is sandwiched between contacting portions of the base housing 3 and the outer lens 5 so as to be integrated all together. The inner housing 4 and the light source unit 8 are thus held without backlash by the base housing 3 and the outer lens portion 5. In addition, terminals 14a penetrate through the intermediate member 14 in the upper and lower direction to be placed into the connecting portion 3c of the base housing 3. The terminals 14a connect the substrate 13 to an external power supply.

All of the light emitting diodes 9, 10, and 11 are general-purpose light emitting diodes. The first light emitting diode 9, which is supported by the support piece 7e of the inner member 7, is positioned at an end (right end) in a longer-length direction of the light guide member 6, corresponding to an end portion (right end portion) of the light entering portion 6b, to emit light to the light entering portion 6b. The second and third light emitting diodes 10 and 11 are positioned in front of the inner lens portion 6c of the light guide member 6, in which the inner lens portion 6c is exposed toward the base housing 3 through the hollow portion 7d, to emit light to the inner lens portion 6c diagonally backward left and leftward. The light guide member 6 is thus configured such that a turn on of the first light emitting diode 9, which is disposed at the right end of the light entering portion 6b forms a long light extending from the light entering portion 6b to the inner lens portion 6c through the light guide portion 6a with the lower illuminant portion at the intermediate portion by the light radiation suppressing portion 6h, and the light is radiated through the light guide member 6 rearward as if the light is divided up and down in appearance. The light guide member 6 is also configured such that a turn on of the second and third light emitting diodes 10 and 11 forms a backward and leftward light radiation diffusely reflected by the inner lens portion 6c.

The emitted light from the first light emitting diode 9 is guided to the light guide portion 6a and the inner lens portion 6c in a scattered manner because of the semispherical shape of the light entering portion 6b of the light guide member 6. An intensity of the emitted light is prevented from being reduced and the light radiation is excellent in design properties. Further, in the present embodiment, the second and third light emitting diodes 10 and 11 are provided at the left end portion, corresponding to an outer portion in the right and left direction of the vehicle body. The light entering a region of the inner lens portion 6c is radiated in the diffused manner through the inner lens portion 6c to the outside. The light radiation thus securely meets legally required illuminance for the turn lamp 2.

The outer lens 5 is arranged to cover the rear of the inner housing 4. Outer peripheral edges of the base housing 3 and the outer lens 5 are abutted and integrated with each other to form the turn lamp 2. The outer lens 5 is integrally formed by a translucent resin material. A light source opposed portion 5a is opposed to the portion at which the first light emitting diode 9 is arranged, the first light emitting diode 9 being supported by the support piece 7e of the inner member 7 of the inner housing 4. The light source opposed portion 5a is arranged adjacent to the first light emitting diode 9 through a stepped portion 5b of the outer lens 5. A light shielding means is provided to the light source opposed portion 5a, and the light guide member 6 is efficiently irradiated by the emitted light from the first light emitting diode 9 because the emitted light from the first light emitting diode 9 is prevented from being radiated (leaking) outside through the light source opposed portion 5a.

In the present embodiment, the light source opposed portion 5a is applied with graining to form the light shielding mean. However, another light shielding means can be applicable by adhesion of a non-translucent seal, or formation of a non-translucent film such as a reflective film.

With the above configurations, the emitted light from the first light emitting diode 9 is prevented from being attenuated at the left end of the light guide portion 6a and uniformly radiated throughout the right and left direction of the light guide portion 6a. Visibility is improved, and the light radiation is excellent in design properties by the light radiation suppressing portion 6h. Further, the light source opposed portion 5a is installed to be covered by the body 1a of the door mirror 1. The light radiation is thus further prevented from leaking outside through the light source opposed portion 5a.

In the above-discussed present embodiment, the turn lamp 2, which is installed into the door mirror 1, is configured such that the emitted light from the first light emitting diode 9 enters the light guide portion 6a of the light guide member 6; the emitted light from the second and third light emitting diodes 10 and 11 enters the inner lens portion 6c; the long light is radiated from the light guide portion 6a rearward to improve design properties; and the light is radiated from the inner lens 6c outward in the right and left direction to satisfy legal requirements. In this case, the light radiation long in the right and left direction appears as if the light is divided up and down when the emitted light from the first light emitting diode 9 enters the light guide portion 6a through the light entering portion 6b because the light guide portion 6a includes the light radiation suppressing portion 6h long in the right and left direction at the intermediate portion in the upper and lower direction. The turn lamp 2 is thus provided to be excellent in visibility and design properties without increasing components by irradiating only the one light guide member 6 (light guide portion 6a) with the one first light emitting diode 9 as if a plurality of long lights are radiated with a plurality of light guides being mounted in appearance.

Further, the design property is achieved as if the light from the light guide portion 6a appears divided because of the light radiation suppressing portion 6h provided to the light guide portion 6a. In this case, the light radiation suppressing portion 6h is excellent in durability and formed without increasing components because the rear surface of the light guide portion 6a is vapor-deposited to form the light radiation suppressing portion 6h.

Further, the light radiation suppressing portion 6h is provide to the projecting end surface of the projection 6g formed and integrated with the light guide portion 6a. The light radiation suppressing portion 6h is easy to form. The light radiation from the one light guide portion 6a appears as if two long lights are radiated because of the clear light shading.

Further, the light radiation suppressing portion 6h is formed by a vapor-deposited metal film. The light radiation suppressing portion 6h is thus further improved in durability.

Of course, the present invention shall not be limited to the above-discussed embodiment. A material (target) of a portion to be vapor-deposited is not limited to a metal in order to form a light radiation suppressing portion by the vapor-deposited portion. Any material will do as long as it can suppress a light radiation, such as a non-translucent resin material. However, aluminum, stainless steel, or the like is also applicable if a material of a vapor-deposited portion is a metal. Further, a impression of a light radiation varies with a light radiation suppressing portion being appropriately arranged to be orthogonal to a longer-length direction or wavy instead of being long in a longer-length direction.

Figure 8A:
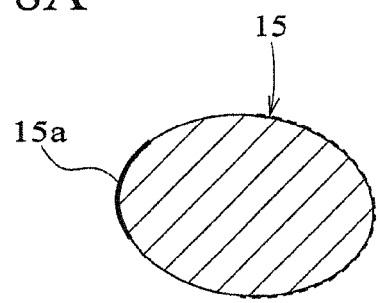
FIG. 8A is a sectional view of a light guide member according to a second embodiment.
Figure 8D:
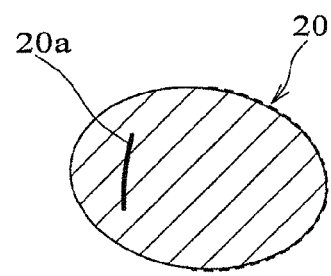
FIG. 8D is a sectional view of a light guide member according to a fifth embodiment.
Figure 8B:
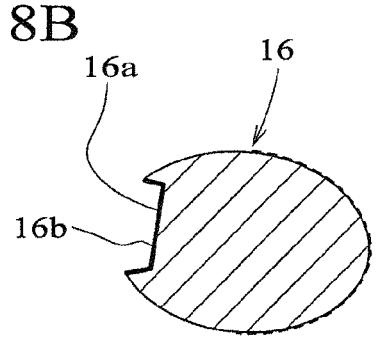
FIG. 8B is a sectional view of a light guide member according to a third embodiments.

Second and third embodiments are also feasible as illustrated in FIG. 8A and FIG. 8B. Light guides 15 and 16 of the second and third embodiments form a turn lamp similar to the first embodiment. The light guide 15 of the second embodiment, which is long and columnar, includes a light radiation suppressing portion 15a having a predetermined width, positioned at an intermediate portion in a shorter-length direction, and formed directly on a light radiating surface. This embodiment also forms a light shading at the intermediate portion in an upper and lower direction and achieves a design property as if two long lights are radiated in appearance when the one light guide 15 is irradiated by one light source.

The light guide 16 of the third embodiment as illustrated in FIG. 8B includes a recess 16a formed to follow a longer-length direction and be positioned at an intermediate portion in a shorter-length direction; and a light radiation suppressing portion 16b formed throughout a recessed surface of the recess 16a. With the light radiation suppressing portion 16b, which extends to a groove side surface of the recess 16a, a shading is clear at a portion where a light radiation at the intermediate portion in an upper and lower direction is suppressed. As a result, two light radiations are apparent when the one light guide 16 is irradiated by one light source.

Figure 8E:
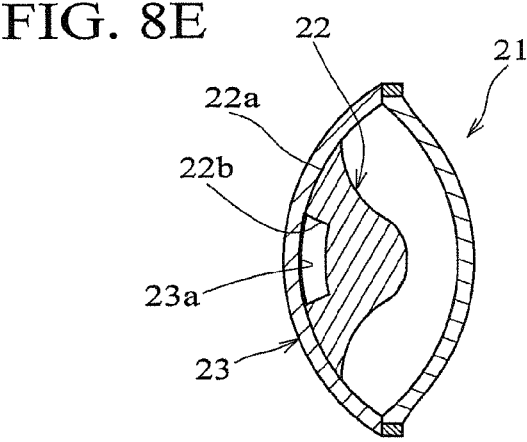
FIG. 8E is a longitudinal sectional view of a turn lamp according to a sixth embodiment.
Figure 8C:
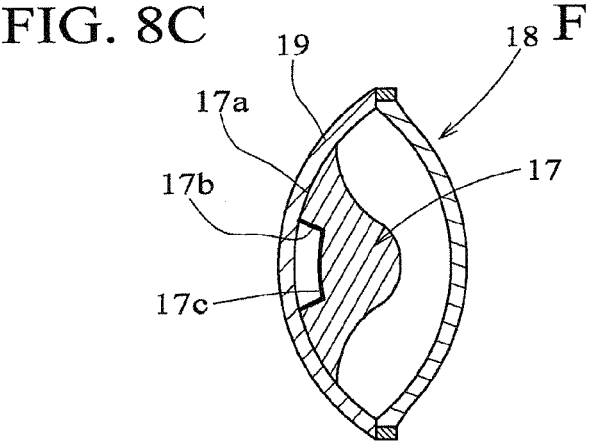
FIG. 8C is a longitudinal sectional view of a turn lamp according to a fourth embodiment.

A turn lamp 18 of a fourth embodiment uses a light guide 17 with a non-columnar shape as illustrated in FIG. 8C. The turn lamp 18 is configured such that an outer lens 19 is positioned in a light radiating direction of a light radiating surface 17a of the light guide 17, a recess 17b is formed at an intermediate portion in an upper and lower direction of the light radiating surface 17a, and a light radiation suppressing portion 17c is provided to a recessed surface extending to a groove side surface of the recess 17b. The fourth embodiment achieves the same effects as in the third embodiment.

A light guide 20 of a fifth embodiment is columnar as illustrated in FIG. 8D. A light radiation suppressing portion 20a is formed of a metal film applied with vapor deposition and positioned at an intermediate portion in an upper and lower direction in the light guide 20. This embodiment also forms two upper and lower light radiations in appearance when the one light guide 20 is irradiated by one light source.

A turn lamp 21 of a sixth embodiment uses a light guide 22 with a non-columnar shape as illustrated in FIG. 8E similar to the third embodiment. An outer lens 23 is arranged in a light radiating direction of the light radiating surface 22a of the light guide 22. A recess 22b is formed at an intermediate portion in an upper and lower direction of the light radiating surface 22a. A light radiation suppressing portion 23a is formed of, for example, a metal film and arranged at a portion facing the recess 22b positioned at a surface side of the light guide 22 of the outer lens 23. This embodiment also achieves the same effects as in the above embodiments.

Figure 8F:
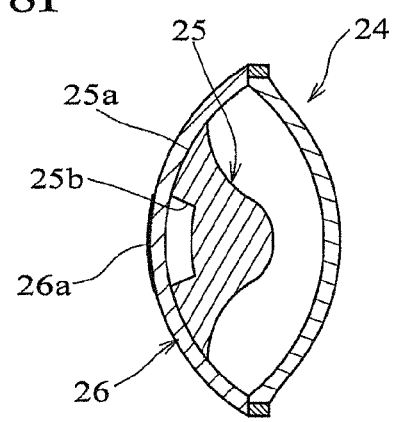
FIG. 8F is a longitudinal sectional view of a turn lamp according to a seventh embodiment.

Similar to the sixth embodiment, a turn lamp 24 of a seventh embodiment is configured such that an outer lens 26 is positioned in a light radiating direction of a light radiating surface 25a of a light guide 25 with a non-columnar shape, and a recess 25b is formed at an intermediate portion in an upper and lower direction of the light radiating surface 25a, as illustrated in FIG. 8F. A light radiation suppressing portion 26a is formed of, for example, a metal film and arranged at a portion opposite to the recess 25b and positioned on an outer surface of the outer lens 26 (i.e., opposite to a side surface of the light guide 25). This embodiment also achieves the same effect as in the above embodiments.

However, the light guides 22 and 25 may not necessarily include the recesses 22b and 25b in the sixth and seventh embodiments. The light radiating surfaces 22a and 25a may overall be attached closely to the outer lenses 23 or 26, respectively. Alternatively, a predetermined interspace may be formed between the outer lens 23 and the light guide 22, the outer lens 24 and the light guide 25.

Figure 9A:
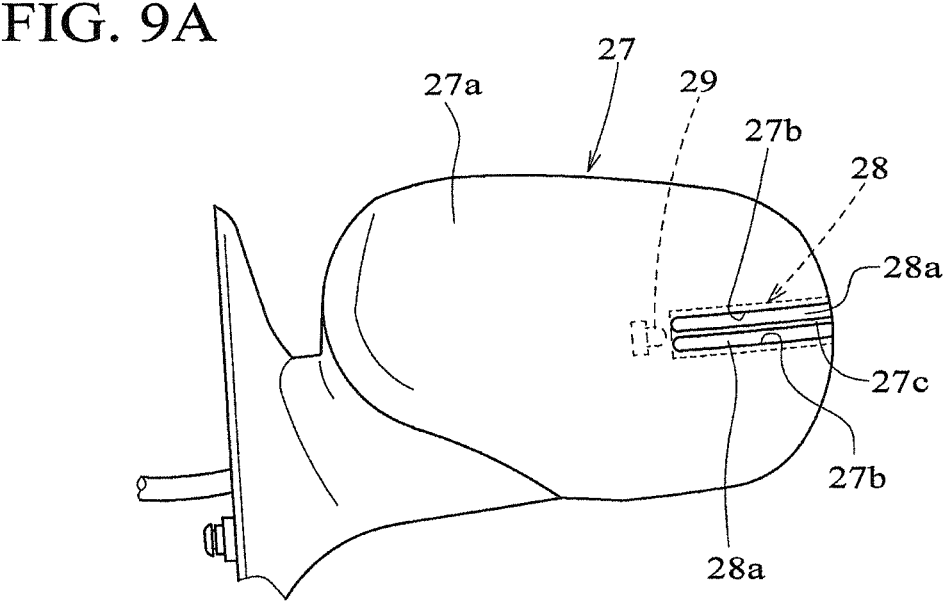
FIG. 9A and FIG. 9B are respectively a back view and a longitudinal sectional view of a door mirror according to an eighth embodiment.
Figure 9B:
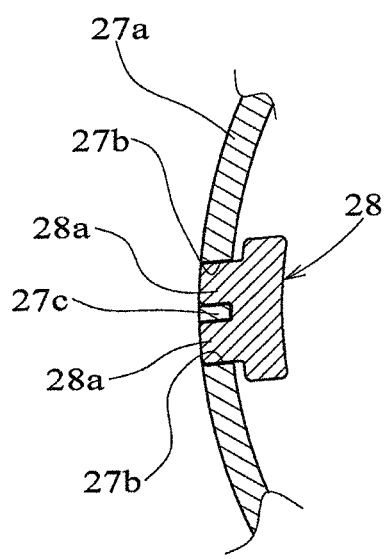

A door mirror 27 of an eighth embodiment as illustrated in FIG. 9 is configured such that two projections 28a are formed up and down in a light guide 28 installed into the door mirror 27. The projections 28a project rearward, long in a right and left direction and fit into two upper and lower through holes 27b open in a body 27a of the door mirror 27. The formation of the two upper and lower through holes 27b further forms a joint portion 27c between the through holes 27b. The joint portion 27c, which is into contact between the upper and lower projections 28a of the light guide 28, serves as a light radiation suppressing portion. This embodiment also achieves a design property where two long lights appear as being radiated when the one light guide 28 is irradiated by a light source 29. Further, a structure can be simplified because the joint portion 27c of the body 27a doubles as the light radiation suppressing portion.

The present invention belongs to the technical field of a vehicle lamp provided in a vehicle such as an automobile. With the configurations of the present invention, the vehicle lamp is provided excellent in visibility and design properties without increasing components. Further, there is industrial applicability in that the structure can be simplified such that a door mirror body can double as a light radiation suppressing portion.

The invention claimed is:
1. A vehicle lamp, comprising;
   a light source; and
   an elongate light guide formed from a transparent material and having opposite first and second ends spaced apart along a longitudinal direction, the light guide having a width direction transverse to the longitudinal direction, the first end being disposed for receiving light from the light source, an inner lens portion adjacent the second end, a light guide portion extending substantially from the first end to the inner lens portion and having a light radiating surface, and a light radiation suppressing portion provided on the light radiating surface of the light guide portion, the light radiation suppressing portion being narrower than the light guide portion in the width direction and being disposed to divide the light radiating surface into two light radiating surface portions extending in the longitudinal direction, wherein a projection is formed on the light radiating surface, the projection having stepped surface portions projected from the light guide portion and positioned at an intermediate portion in the width direction and elongated toward the longitudinal direction, and a projecting end surface formed across the both ends of the stepped surfaces, the light radiation suppressing portion is a vapor-deposited portion formed on the projecting end surface in the projection, light radiated from the light source radiates from the light guide portion and the stepped surface portions of the projection in a state that two divided lights elongated toward the longitudinal direction are radiated from the both ends of the light suppressing portion, and light radiated from the light source to the inner lens portion is diffused to be wider than each of the two lights radiating from the light radiating surface.

2. The vehicle lamp of claim 1, wherein the light radiation suppressing portion is formed of a metal film.

3. The vehicle lamp of claim 1, which is a direction indicator lamp installed into a door mirror.

* * * * *